C. SCIAMENGO.
METHOD OF AND DEVICE FOR CUTTING OUT CONTOUR BANDS USED IN COLORING KINEMATOGRAPH FILMS.
APPLICATION FILED NOV. 2, 1911.

1,022,270.
Patented Apr. 2, 1912.

Inventor.
Carlo Sciamengo,

UNITED STATES PATENT OFFICE.

CARLO SCIAMENGO, OF TURIN, ITALY.

METHOD OF AND DEVICE FOR CUTTING OUT CONTOUR-BANDS USED IN COLORING KINEMATOGRAPH-FILMS.

1,022,270.

Specification of Letters Patent.

Patented Apr. 2, 1912.

Application filed November 2, 1911. Serial No. 658,248.

*To all whom it may concern:*

Be it known that I, CARLO SCIAMENGO, a subject of the King of Italy, and residing at Turin, Italy, have invented certain new and useful Improvements in Methods of and Devices for Cutting Out Contour-Bands Used in Coloring Kinematograph-Films, of which the following is a specification.

This invention relates to the cutting out of the contour or stencil bands used in coloring kinematograph films. It is well known that at present these contour bands are very expensive because it is necessary to cut out a printed film, and in general they are not perfect since the operator cannot follow with precision the finer details of the profile of the picture.

The present invention has for its object to remove these drawbacks, and consists in an improved method of cutting out the said contour bands, in which an enlarged image from the printed film is projected on to a screen, and the desired contour cut out from a waste film by means of mechanism actuated by a point which is traced over the profile of the enlarged image.

The invention also consists in a device for carrying out the improved method, in which device the film to be cut out is given a movement of advance corresponding to that of the printed film, by means of a positive drive, and the point which is traced over the profile of the enlarged image is connected to the instrument operating the cutting out in such manner that the said instrument faithfully reproduces on a reduced scale all the movements of the point.

One example of a device for carrying out the improved method is illustrated diagrammatically in the accompanying drawings in which—

Figure 1:
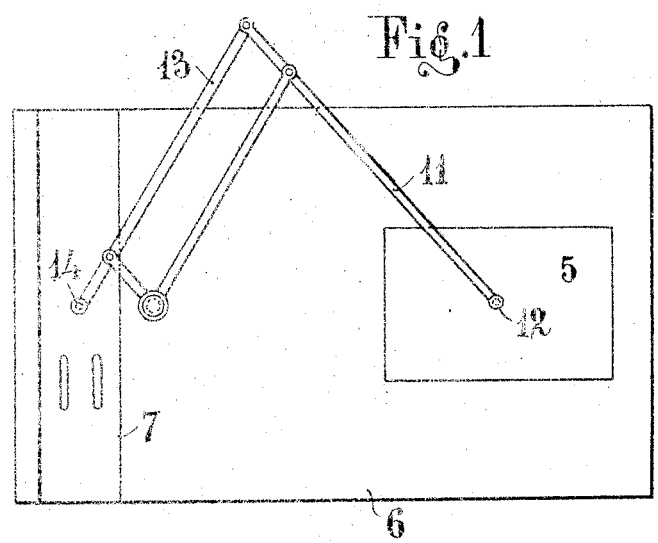
Figure 2:
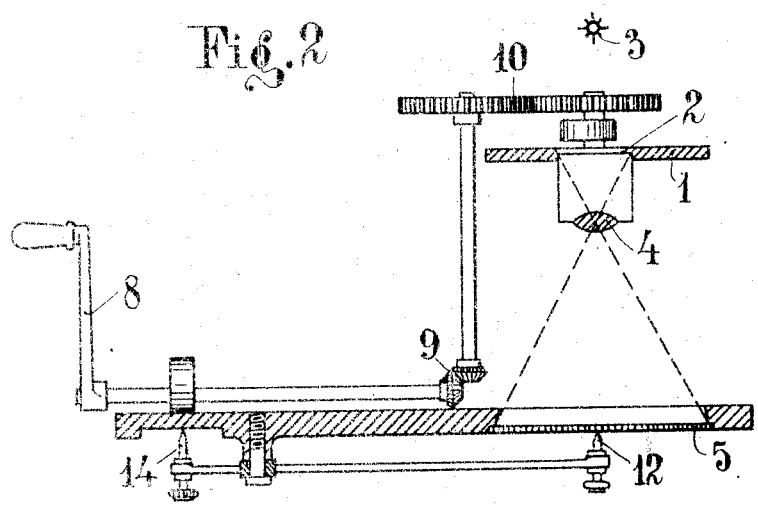

Figure 1 is a front elevation and Fig. 2 a plan.

The device comprises a small table 1, in which is guided the film 2, a contour band of which is to be prepared. The film 2 is given an advance movement in the usual manner by means of an intermittently moving driving mechanism of any type, and the image on the film is projected by means of a source of light 3 through a lens 4 in such manner as to give an enlarged image on a screen 5 of ground glass for example. This screen 5 is mounted on a support 6 which also carries the guide 7 in which slides the film to be cut out. The mechanism for driving this film is actuated by a handle 8 and is positively connected to the mechanism driving the film 2, by means of gearing 9, 10, for example, so that when the first film advances by one picture the second film advances exactly the same distance. On the support 6 is also mounted a jointed link parallelogram of which one member 11 is provided with a point 12 which can be traced over the screen 5, while the adjacent link 13 carries a point 14 which can trace over the film moving in the guide 7, and cut the said film. It is obvious that this link parallelogram operates in the manner of a pantograph and while the operator guides the point 12 over the screen 5 on which the picture of film 2 is enlarged, the point 14 suitably adapted for the purpose and mounted with the necessary precision, cuts out a waste film along a contour exactly equivalent to that of the vignette of the original film. The cutting out is thus executed with the greatest precision since the operator traces out the enlarged figure on the screen 5 with the point 12. At the same time it is not necessary to cut a printed film, since a waste film of no commercial value may be used for the contour band.

What I claim as my invention and desire to secure by United States Letters Patent is:—

1. A method of cutting out contour bands as used in coloring kinematograph films consisting in projecting and enlarging the images of the printed film on to a screen, tracing a point over the profile of said enlarged images and cutting a waste film by means of a device controlled by said point.

2. Apparatus for cutting out contour bands as used in coloring kinematograph films comprising a table, a screen in said table, a printed film, means for projecting the images of the printed film on said screen, a band advancing in accordance with the printed film, a point capable of being traced over the profile of the images on the screen, means for cutting the contour band and connections between said cutting means and the controlling point.

3. Apparatus for cutting out contour bands as used in coloring kinematograph films comprising a table, a ground glass screen in said table, a printed film, means for projecting and enlarging the images of the printed film on said screen, a band advancing in accordance with the printed film, a point capable of being traced over the profile of the images on the screen, means for cutting the band and connections between said cutting means and the controlling point reducing the scale.

4. Apparatus for cutting out contour bands as used in coloring kinematograph films comprising a table, a screen in said table, a printed film, means for projecting the images of the printed film on said screen, means for advancing said film, a celluloid band, means for advancing said band in accordance with the printed film, a point capable of being traced over the profile of the image on the screen, means for cutting the band and connections between said cutting means and the controlling point.

5. Apparatus for cutting out contour bands as used in coloring kinematograph films comprising a table, a screen in said table, a printed film, means for projecting the images of the printed film on said screen, means for advancing said film, a waste film, means for advancing said waste film in accordance with the printed film, a point capable of being traced over the profile of the images on the screen, means for cutting the waste film and connections between said cutting means and the controlling point.

6. Apparatus for cutting out contour bands as used in coloring kinematograph films comprising a table, a screen in said table, a printed film, means for projecting and enlarging the images of the printed film on said screen, means for advancing said film, a band, means for advancing said band positively connected with means for advancing the printed film, a point capable of being traced over the profile of the images on the screen, means for cutting the band and a pantograph connecting said point with the cutting means.

In testimony whereof I affix my signature in presence of two witnesses.

CARLO SCIAMENGO.

Witnesses:
LA BRUNA GIOVANNI,
CARLO TORTA ING.